(12) United States Patent
Matsumoto et al.

(10) Patent No.: US 8,036,775 B2
(45) Date of Patent: Oct. 11, 2011

(54) OBSTACLE AVOIDANCE SYSTEM FOR A USER GUIDED MOBILE ROBOT

(75) Inventors: Kosei Matsumoto, Yokohama (JP); Toshio Moriya, Tokyo (JP); Kazuo Yano, Hino (JP)

(73) Assignee: Hitachi, Ltd., Tokyo (JP)

( * ) Notice: Subject to any disclaimer, the term of this patent is extended or adjusted under 35 U.S.C. 154(b) by 824 days.

(21) Appl. No.: 11/396,643

(22) Filed: Apr. 4, 2006

(65) Prior Publication Data

US 2007/0100498 A1     May 3, 2007

(30) Foreign Application Priority Data

Oct. 27, 2005    (JP) ................................ 2005-312141

(51) Int. Cl.
*G05D 1/02* (2006.01)
*G05D 1/12* (2006.01)
*G05D 1/00* (2006.01)
*G06F 19/00* (2006.01)

(52) U.S. Cl. ........ 700/253; 700/245; 700/255; 700/257; 700/259; 700/264; 701/23

(58) Field of Classification Search .......... 700/245–264; 701/23
See application file for complete search history.

(56) References Cited

U.S. PATENT DOCUMENTS

| | | | |
|---|---|---|---|
| 4,751,658 A * | 6/1988 | Kadonoff et al. | 701/301 |
| 4,862,373 A * | 8/1989 | Meng | 701/209 |
| 6,584,375 B2 * | 6/2003 | Bancroft et al. | 700/213 |
| 6,917,855 B2 * | 7/2005 | Gonzalez-Banos et al. | 700/245 |
| 2005/0237188 A1 * | 10/2005 | Tani | 340/541 |
| 2009/0234527 A1 * | 9/2009 | Ichinose et al. | 701/23 |
| 2010/0222925 A1 * | 9/2010 | Anezaki | 700/253 |
| 2010/0222954 A1 * | 9/2010 | Ichinose et al. | 701/26 |
| 2011/0098874 A1 * | 4/2011 | Choi et al. | 701/26 |

FOREIGN PATENT DOCUMENTS

JP    61-240306      10/1986

(Continued)

OTHER PUBLICATIONS

Myers G., Julia L. Cheyera, and Gherbi S., "Multimodal User Interface for Mobile Robots," Eleventh Annual Symposium on User Interface Software and Technology, 1998.

(Continued)

*Primary Examiner* — Khoi Tran
*Assistant Examiner* — Dale Moyer
(74) *Attorney, Agent, or Firm* — Antonelli, Terry, Stout & Kraus, LLP

(57) ABSTRACT

The system includes a mobile apparatus that moves after receiving an input of a path. The system has a path-setting unit for setting the path of a mobile apparatus according to the inputted path, a measuring unit for measuring an environment in which the mobile apparatus exists, an extracting unit for extracting an object existence region in the environment according to the values measured by the measuring unit, a judging unit that judges the validity of the path according to (1) the path set by the path setting unit and (2) the object existence region extracted by the extracting unit, a position determining unit that determines a target position to which the mobile apparatus is to move by selecting it from the portions of the path judged as valid, and a movement controller for controlling the mobile apparatus to move to the target position.

13 Claims, 7 Drawing Sheets

FOREIGN PATENT DOCUMENTS

| | | |
|---|---|---|
| JP | 62-34784 | 2/1987 |
| JP | 63-316218 | 12/1988 |
| JP | 06-031657 | 2/1994 |
| JP | 07-129238 | 5/1995 |
| JP | 10-333746 | 12/1998 |
| JP | 11-194822 | 7/1999 |
| JP | 11-249734 | 9/1999 |
| JP | 2001-125646 | 5/2001 |
| JP | 2003-029833 | 1/2003 |
| JP | 2003-050559 | 2/2003 |
| JP | 2004-126983 | 4/2004 |
| JP | 2005-050105 | 2/2005 |
| JP | 2005-326944 | 11/2005 |

OTHER PUBLICATIONS

Kazumi Oikawa, Takeshi Tsuchiya, "A Method of Off-Line Teaching for Corridor Environment with Freehand Maps," vol. 17, No. 5, pp. 100-109, the Journal of Robotics Society of Japan, 1999.

\* cited by examiner

OBSTACLE AVOIDANCE SYSTEM FOR A USER GUIDED MOBILE ROBOT

INCORPORATION BY REFERENCE

The present application claims priority from Japanese application JP 2005-312141 filed on Oct. 27, 2005, the content of which is hereby incorporated by reference into this application.

BACKGROUND OF THE INVENTION

The present invention relates to autonomous mobile robots.

A technique for autonomous mobile a robot is proposed in which an user previously draws a path of the robot on a PC screen not to collide with obstacles (see, Myers G., Julia L. Cheyera, and Gherbi S., "Multimodal User Interface for Mobile Robots," Eleventh Annual Symposium on User Interface Software and Technology, 1998). In addition, there is another technique in which the user previously draws a brief path of the robot on a PC screen and sets on the PC screen the markers of intersections, T-shaped cross points and so on existing in the actual environment (see, Kazumi Oikawa, Takeshi Tsuchiya, "A Method of Off-Line Teaching for Corridor Environment with Freehand Maps," Vol. 17, No. 5, pp. 100-109, the Journal of the Robotics Society of Japan, 1999).

SUMMARY OF THE INVENTION

In the first nonpatent literature, or "Multimodal User Interface for Mobile Robots," it is necessary to precisely set the path not to collide with obstacles. In the second nonpatent literature, or "A method of Off-Line Teaching for Corridor Environment with Freehand Maps," it is necessary to set the markers although a precise path is not necessary. Thus, in the conventional techniques, it is necessary to previously set the details of information of the environment in which the robot exists, and hence such operations are troublesome for the user.

Accordingly, an objective of the invention resides in the construction of a robot that is enabled to autonomously move simply by inputting a rough path.

In order to solve the above problems, there is provided a system according to one of the preferred embodiments of the invention as follows.

The system of the invention has a path-setting unit that sets a path of a mobile apparatus according to the inputted path, a measuring unit for measuring an environment in which the mobile apparatus exists, and an extracting unit for extracting an existence region of an object that exists in the environment according to the measured result from the measuring unit. The system further has a judging unit that judges the validity of the path according to (1) the path set by the path setting unit and (2) the object existence region extracted by the extracting unit, a position determining unit that determines a target position to which the mobile apparatus is to move from the paths that were not judged as invalid by the judging unit, and a movement controller for controlling the mobile apparatus to move to the target position.

Other objects, features and advantages of the invention will become apparent from the following description of the embodiments of the invention taken in conjunction with the accompanying drawings.

DESCRIPTION OF THE INVENTION

Embodiment 1

An embodiment of the invention will be described with reference to the accompanying drawings.

Figure 1:
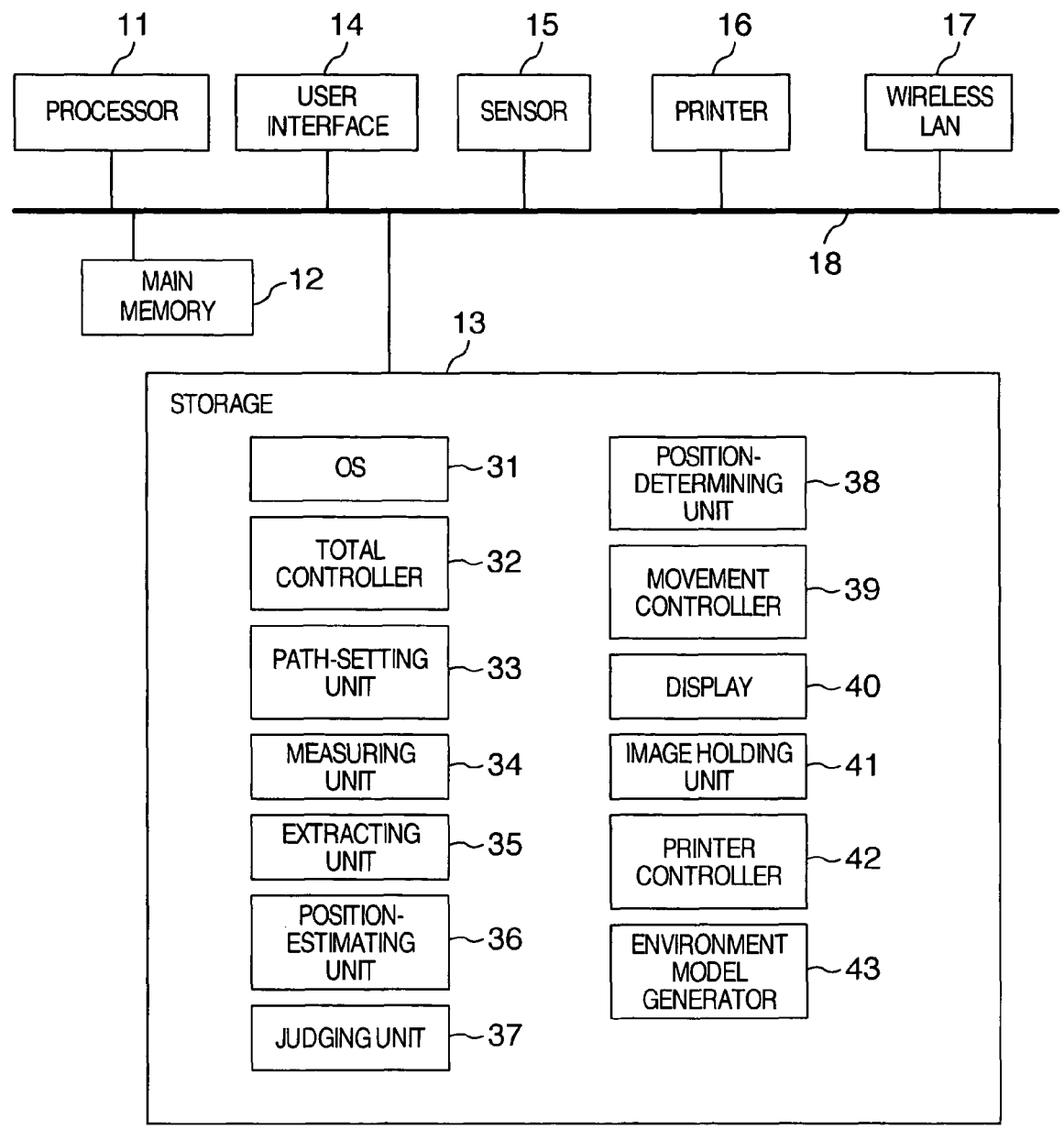
FIG. 1 is a block diagram of the hardware construction of the system.

FIG. 1 is a diagram showing the hardware construction of a system of this embodiment.

This system has a processor 11 for the processing based on a program, a main memory 12 for temporarily storing data, a storage 13, a user interface (display, graphic board, mouse, robot control board, range finder control board and so on) 14, a sensor 15, a printer 16, a wireless LAN 17 and a connection line 18 for connecting these units.

The robot treated in this invention may be any mobile apparatus. For example, the system itself shown in FIG. 1 may be used as a robot or a carriage that carries this system may be used as a robot. In addition, the shape of the robot may be an arbitrary type such as vehicle type, vessel type or leg type.

The storage 13 includes programs for the functions of an OS 31, a total controller 32 for controlling the whole processing, a path setting unit 33 for setting a path based on the user's input operation, a measuring unit 34 for controlling the sensor 15 to measure, an extracting unit 35 for extracting the obstacle existence area, a position estimating unit 36 for estimating the position of the robot, and a judging unit 37 for making various judgments when the path of the robot is determined. The storage 13 also includes programs for the functions of a position determining unit 38 for determining the target position of the robot, a movement controller 39 for controlling the robot to move to the target position, a display 40 for displaying a generated image, an image holding unit 41 for holding the processed result such as generated images, a printer controller 42 for controlling the printer 16, and an environmental model generator 43 for generating the model of an environment.

The processor 11 makes the above-mentioned programs be loaded from the storage 13 into the main memory 12, and processes the programs. However, the functions for these programs may be built up by hardware such as LSI. In addition, these functions can of course created by only hardware, only software or a combination of hardware and software. Moreover, the programs for implementing the above functions and the data such as the measurement values from the sensor may be transferred from a storage medium such as CD-ROM or downloaded from other apparatus via a network.

The hardware and software mentioned above can be arbitrarily selected according to the embodiments.

The sensor 15 may be an arbitrary device as far as it is capable of measuring the distance and direction relative to the obstacle such as a laser range finder (that measures by using a laser to scan in the horizontal and vertical directions), an infrared sensor, an ultrasonic sensor, or camera. In addition, while this embodiment is assumed a wheeled-type mobile robot that autonomously moves in an unknown environment, the sensor may be mounted on a vehicle or vessel other than the robot. In addition, the range of angles over which the sensor scans may be arbitrary.

The connection line 18 may be arbitrary if it can interconnect the constituents shown in FIG. 1.

Figure 2:
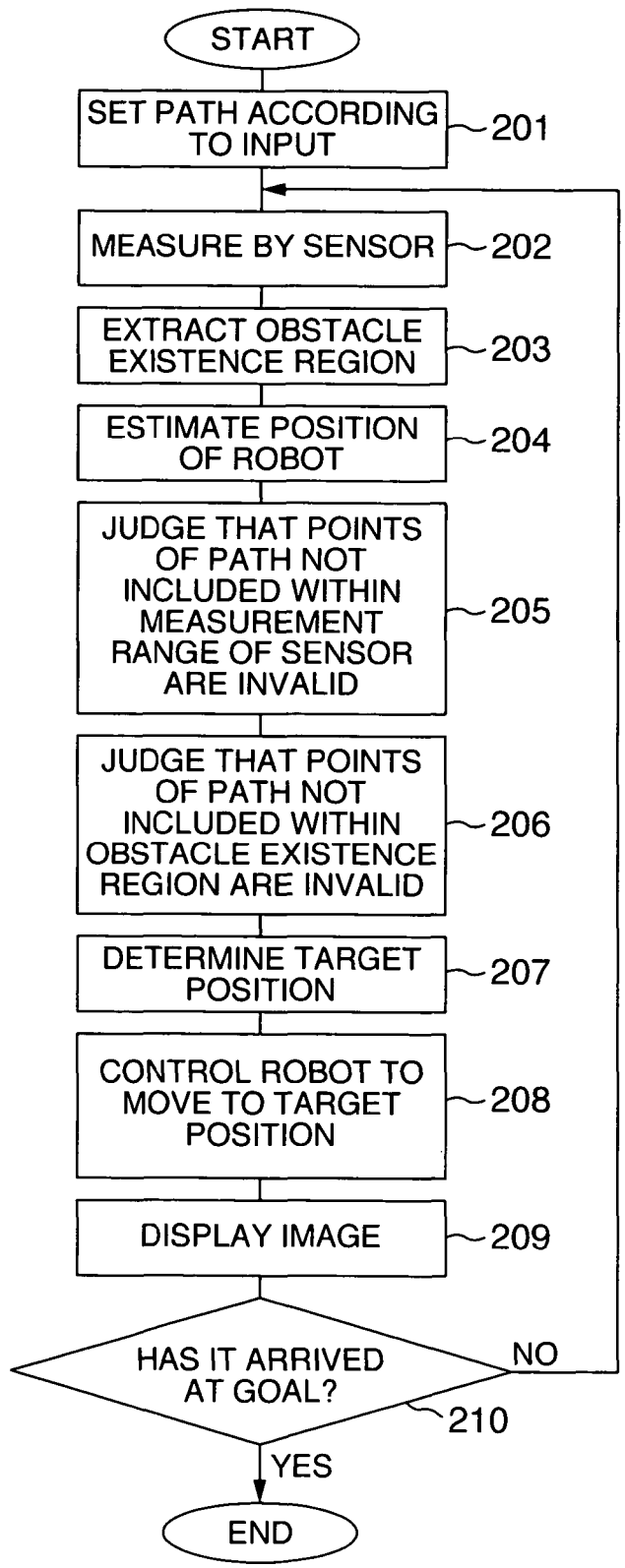
FIG. 2 is a flowchart for the control of a robot.

FIG. 2 is a flowchart for the control of the robot. The processing shown in FIG. 2 will be described with reference to FIG. 3 through FIG. 6. While the functional modules such as the path setting unit and so on will be hereinafter described as if they were hardware (the functional modules themselves make the processing), the functions achieved by the software are of course realized by the processor 11 that executes the programs.

Figure 3:
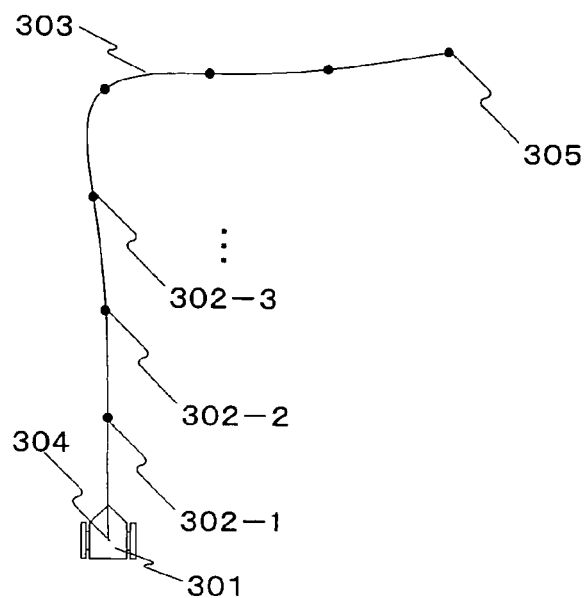
FIG. 3 is a diagram showing the path-setting screen.

First, the user inputs on the path-setting screen (see FIG. 3) a rough path along which the robot is to move by using a pointing device such as mouse. The path indicated by reference numeral 303 in FIG. 3 is the inputted path. The user may set the initial position and posture by manipulating an icon 301 of the robot on the screen.

The path setting unit 33 sets a plurality of points 302 (for example, identifiers such as integral values of 1, 2 . . . are allocated to the points 302-1, 302-2, . . . ) for the path along which the robot can move according to the input information that the user enters. Then, it generates a sequence of points 303 that are interpolated between the points 302 (step 202). This train of points, which is information of an initial position 304 of the robot, a terminal 305 of the path, and a plurality of points 302, is stored in the main memory 12.

Figure 4:
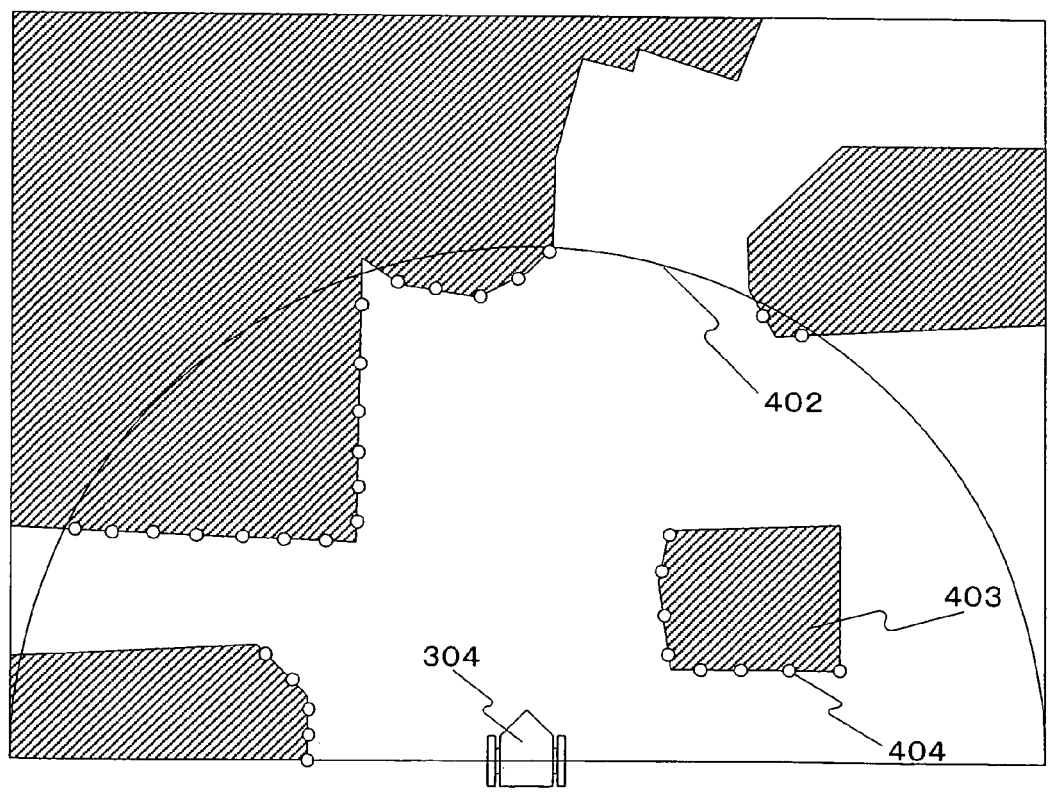
FIG. 4 is a diagram showing the situation in which the location of an obstacle is measured.

Then, the measuring unit 34 controls the sensor 15 to measure the environment (step 202). FIG. 4 shows the situation in which the sensor measures the positions of obstacles in an unknown environment. It is assumed that the robot is located at the initial position 304 and scans a range 402 by the laser to produce sensor data of the distance and direction relative to an obstacle 403 existing in the actual environment. This sensor data is processed to produce the points, 404 to which the laser beam is irradiated by scanning the area including the obstacle as illustrated.

Figure 5:
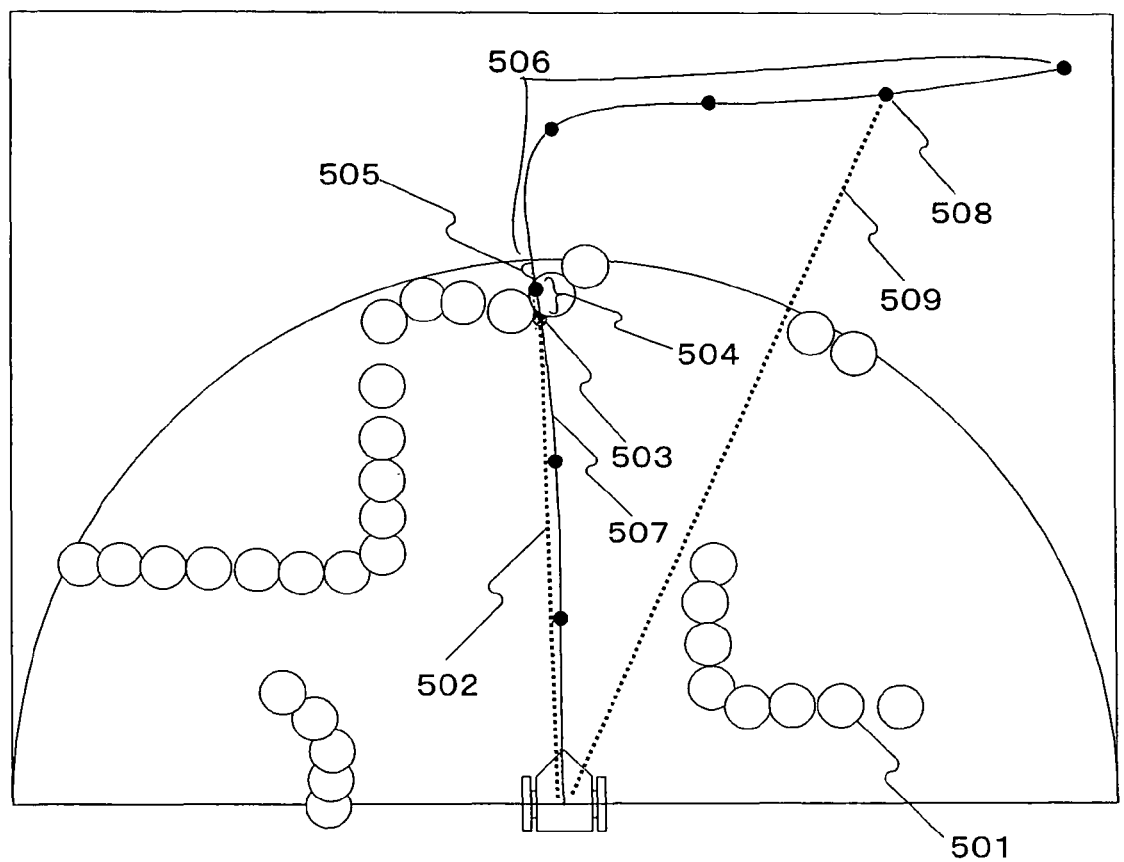
FIG. 5 is a diagram showing the positional relation between the area in which the obstacles may exist and the path that the user inputted.

Next, the extractor 35 extracts the obstacle existence region (step 203). Specifically, the points 404 obtained by measurement are respectively swollen to produce circular regions 501 (see FIG. 5) as the obstacle existence region by computation, and recorded as an image. When the points are swollen, the expansion rate is previously established relative to the size of the robot. The path information that the user entered is depicted together with this image, thus producing the image shown in FIG. 5. FIG. 5 shows the positional relation between the obstacle existing region and the path inputted by the user that can be observed from the current position of the robot.

Then, the position-estimating unit 36 estimates the position of the robot (step 204). Here, the estimation of the position of the robot is to estimate the position/posture of the robot in the coordinate system with the initial position of the robot as the origin (hereinafter, referred to as the initial position coordinate system). The position of the robot can be estimated by finding the relative position/posture so that the geometrical features of the sequentially obtained sensor data can be most overlapped, and by accumulating those values (see JP-A-2005-32644).

Then, the judging unit 37 judges the validity of the path. Specifically, the judging unit 37 first judges the sequence of points, 506 out of the sensor's measurement range to be invalid in the path (step 205). Next, it judges the sequence of points, 504 included in the obstacle existence region to be invalid (step 206).

Subsequently, the position-determining unit 38 determines the target position of the robot (step 207). Specifically, the point of the largest identifier among the sequence of points which were not judged as invalid (that is, judged as valid) in the previous step, is regarded as the point closest to the terminal point and selected as the target position 503. From FIG. 5, the effective sequence of points within the range of the sensor is found to be only the sequence of points, 507 (the line from the current position of the robot to the target position 503, of the path 303 that the user entered). Thus, the robot moves along a line 502 (the line connecting the initial position 304 and the target position 503) toward the point 503 as the largest identifier of the sequence of points 507. However, if the scanning range of the sensor is very wide enough to include the entire path that the user entered in FIG. 5, the point of the largest identifier is a point 508. Thus, the target position is set at 508 so that the robot can be moved toward the point 508 along a line 509 (the line connecting the initial position 304 and the target position 503).

Then, the movement controller 39 controls the robot to move to the target position 503 (step 208).

Subsequently, the display 40 displays the point of target position 503 on the screen according to the image depicted as the path inputted by the user and the image obtained in step 203 (step 209).

As the target position is determined one after another along with each movement of the robot by repeating the above processes, the robot can move toward the terminal position.

The judging unit 37 judges whether the robot has arrived at the terminal position (step 210). If it does not reach the terminal position, a sequence of processes is repeated. If it has reached the terminal position, the processing is finished.

Figure 6:
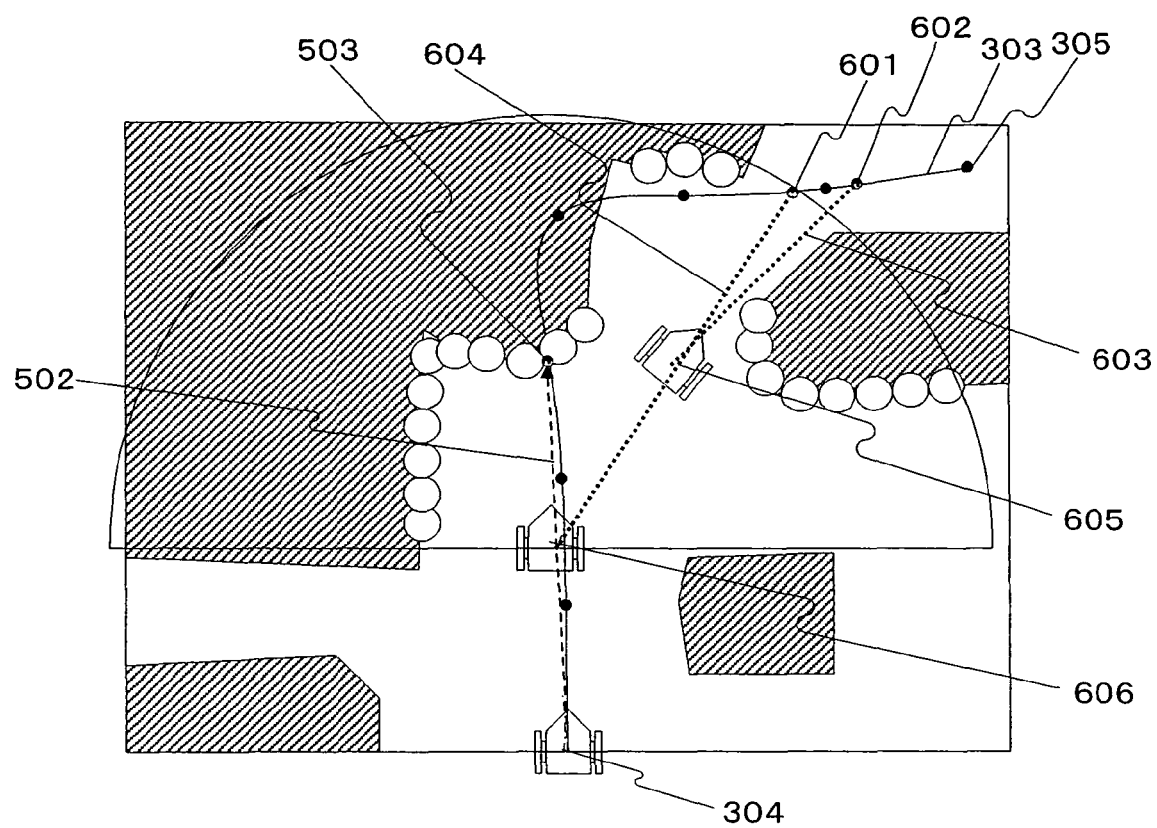
FIG. 6 is a diagram showing the situation in which the robot moves as it determines the target position.

FIG. 6 shows the situation in which the robot is moving as it determines the target position.

When the robot is located at the initial position 304, the target position is the point 503. Therefore, the robot moves along the line 502. However, as the robot moves, the scanning range of the sensor shifts forward. When the robot arrives at a position 606, the sensor catches a point 601 of larger identifier than the point 503. Thus, at this time, the robot changes the target position to the point 601, and moves along a line 604 toward the point 601. When the robot arrives at a position 605, the sensor catches a point 602 of larger identifier than the point 601. Therefore, at this time, the robot changes the target position to the point 602, and moves along a line 603 toward the point 602. Thus, the robot moves to the terminal position 305.

According to this embodiment, when the user roughly specifies even a path that passes the obstacle existence region, the robot can be controlled to move to the terminal position without colliding with the obstacle. Thus, this embodiment can be expected to apply to vehicles, vessels or automatic cleaners that autonomously move in an unknown environment.

Embodiment 2

The embodiment 2 is a robot with a printer mounted.

The user is able to set the path of the robot by using the wireless LAN 17 and the user interface such as a remote PC without limiting to the user interface mounted on the robot. This function can be achieved by the equipment for the remote desktop technology that enables the image to be displayed on a remote PC or by the equipment that enables GUI to be operated on the home page (hereinafter, referred to as HP) from a remote PC.

For example, it is assumed to previously create paths of the robot between the seats of a plurality of users who work in an office. At this time, when a certain user orders a printout through the wireless LAN, the printer controller 42 starts printing-out operation. As the printing-out operation goes on, the robot starts to move from the current position to the seat of the user who ordered the printout. Thus, the printing-out operation can be carried out in parallel with the movement of the robot.

According to this embodiment, other apparatus than the robot can be remotely controlled in parallel with the movement of the robot as well as an object is simply carried. For example, this embodiment can be expected to apply to the robot that carries a cup of coffee to a specified seat while it is being made.

Embodiment 3

The third embodiment 3 concerns a system that displays collected environmental information for remote users.

Figure 7:
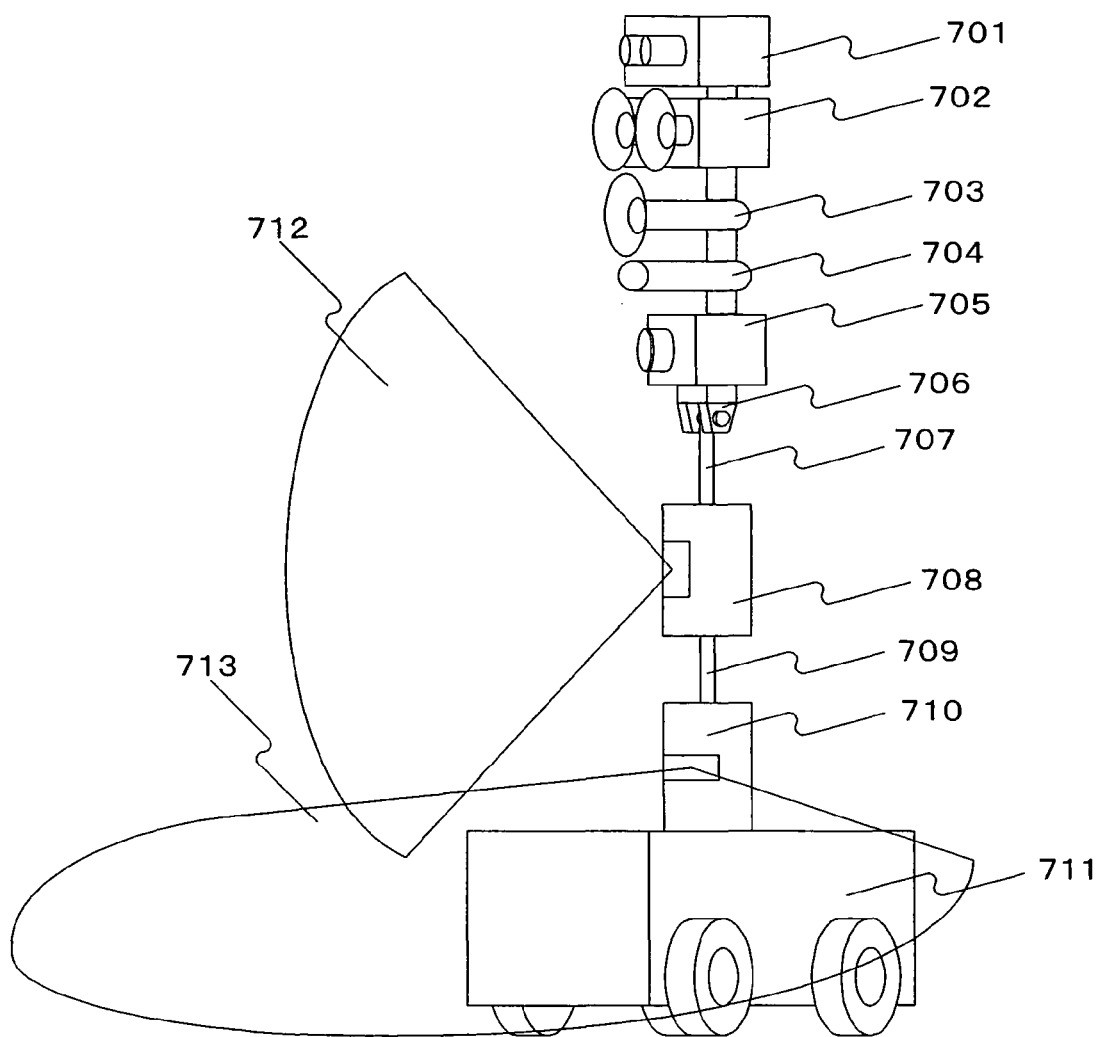
FIG. 7 is a diagram showing the appearance of the robot.

FIG. 7 shows the appearance of the robot. On a carriage 711 are mounted a camera 705, laser range finders 708 and 710, an infrared sensor 701, an ultrasonic sensor 702, a microphone 704 and a loud speaker 703. These devices can be adjusted in their pan/tilt and height by a universal head assembly 706, 707, 709. In addition, the laser range finder 708 measures the geometrical shape of an obstacle as viewed in the vertical direction by using a vertically scanning laser 712. The laser range finder 710 measures the geometrical shape of an obstacle as viewed in the horizontal direction by using a horizontally scanning laser 713.

This robot is placed in an office or factory, and the user gives a rough path to the robot. This path may be given on the PC screen mounted on the robot or on a remote PC screen. The measuring unit 44 controls the laser range finders 708, 710, camera 705, infrared sensor 701, ultrasonic sensor 702 and microphone 704 to measure.

In the measured sensor data (hereinafter, referred to as multi-sensor data), the multi-sensor data from the laser range finder that horizontally scans is used to find the position and posture of the robot as in the embodiment 1. Then, this position/posture and time are added to the multi-sensor data, and recorded in the main memory 12 and storage 13. Thus, from the recorded data, it can be easily understood when and where the robot has acquired what multi-sensor data.

The environmental model generator 43 generates an environmental model. Here, the environmental model indicates the superposition of the recorded multi-sensor data on a three-dimensional geometric model. In order to generate the three-dimensional geometric model, the position of each point of the sensor data from the laser range finders is determined on the initial position coordinate system according to the estimated positions/postures of the robot and universal head. Thus, the sensor data resulting from the vertical scanning by the laser range finder 708 is plotted on a three-dimensional space relative to the initial position coordinate system. Similarly, the sensor data from the infrared sensor 701 and ultrasonic sensor 702 are plotted on the same three-dimensional space. The image data from the camera 705 is attached as a texture onto the three-dimensional model produced by the laser range finder 708. In addition, the audio data from the microphone is not plotted but held in a form of data structure that can be tracked back from the position/posture of the robot. In this way, the environmental model can be generated.

The generated environmental model of a region, if it is an office within a building, is held so that the model can be tracked back from the building model. Here, as an example, a building is searched for on an HP of the Web, and the environmental model of an office of the building is referred to as will be mentioned below.

Figure 8:
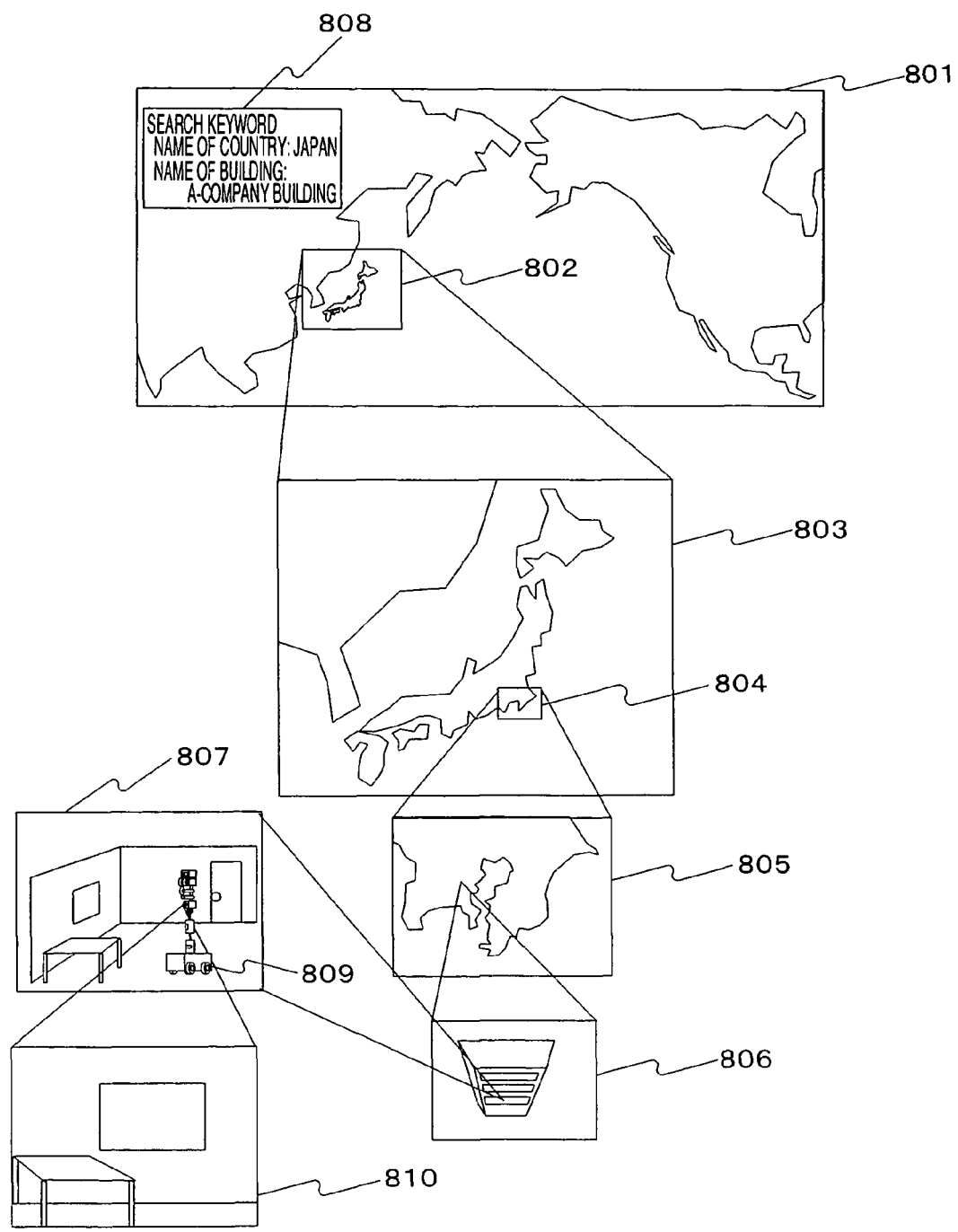
FIG. 8 is a diagram showing the screen of an HP (home page) displayed on the Web browser.

FIG. 8 is a diagram showing a screen of an HP on the Web browser.

This screen contains a world map 801 and a keyword search input column 808. This world map and the following maps are assumed to have images that are actually photographed from satellite and aircraft and attached as texture onto the three-dimensional geometric model.

When referring to the environmental model of the office of an A-company building in Japan, the user selects Japan 802 from the world map. Thus, the Japanese map is displayed in a magnified form (803). When the user selects a Kanto district 804 on this map, the Kanto district 804 is displayed in a magnified form (805). Then, when the user selects the A-company building on this district, a textured three-dimensional model is displayed (806). In addition, the user specifies a particular room on the three-dimensional model of this building, the model of the room is displayed (807).

In addition to the selection of a desired model on the image given above, keyword search can be carried out by previously registering names for models. In this case, the user enters a country name and building name in the keyword search input column 808 to acquire the model. When the user specifies a country name and building name as shown in FIG. 8, the environmental model of 806 is displayed according to the building name. The displayed environmental model can be changed for its observing point and view direction and magnified or reduced in its size by manipulating an input device.

When the environmental model having a robot placed is displayed, a CG model 809 of the robot is indicated. This robot can be instructed to move by the setting of the path described in the section of embodiment 1.

Thus, when the robot is moved in a region in which the environmental model is not produced yet, the multi-sensor data of a new environment can be acquired, and thus the environmental model can be generated. The newly generated environmental model can be referred to on the Web. In addition, the camera 705 mounted on the robot can produce the image 801, which is then displayed. Thus, the user can see the actually photographed image of the environment.

The above operations are performed on the screen of PC, television, cell phone, PDA or projector. Particularly when the projector's screen is used, high-resolution/wide-angle pictures can be displayed by the projection of images from a plurality of projectors to a plane or nonplanar screen (cylindrical surface or spherical surface).

While the general-purpose Web browser is used for the user to refer to the environmental model as described above, the same effect can be achieved by using dedicated viewer software.

According to the invention described above, it is possible to build the robot that can autonomously move by simply inputting a rough path.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A system including a mobile apparatus, the system comprising:
a signal generator mounted on the mobile apparatus;
a sensor mounted on the mobile apparatus;
a user interface;

at least one storage device, the at least one storage device including:
- a path-setting unit configured to set a path of the mobile apparatus as a sequence of points according to an inputted path that is inputted through the user interface,
- a measuring unit configured to measure an environment in which the mobile apparatus is situated, by emitting a signal from the signal generator to at least a predetermined measurement range of the sensor, and by using the sensor to generate measurements of the environment,
- an extracting unit configured to extract an object existence region that represents a position of an object in the environment, according to measurements generated by the measuring unit,
- a judging unit configured to judge as invalid a point on the inputted path when the point is at least one of (1) not within the predetermined measurement range of the sensor and (2) within the object existence region,
- a target position determining unit to:
  - (1) determine a first target position on the inputted path to which the mobile apparatus is to move, by selecting the point on the inputted path that is both closest to the terminal position of the inputted path and not judged as invalid by the judging unit, and
  - (2) update the first target position to a second target position on the inputted path, as a result of movement of the mobile apparatus, regardless of whether or not the mobile apparatus has reached the first target position, when the second target position is determined to be both closest to the terminal position of the path and not judged as invalid by the judging unit, and
- a movement control unit configured to determine a movement path of the mobile apparatus so that the mobile apparatus moves along the movement path from a current position to the first target position, and when the first target position is updated to the second target position, to update the movement path so that the mobile apparatus moves to the second target position; and
- a processor configured to, while the mobile apparatus is moving and until the mobile apparatus reaches the terminal position of the path, repeatedly execute processing to: measure the environment with the measuring unit, extract an object existence region with the extracting unit, judge as invalid a point on the inputted path with the judging unit, determine the target position with the target position determining unit, and determine the movement of the mobile apparatus with the movement control unit.

2. The system according to claim 1,
wherein the judging unit is configured to judge as invalid a first portion of the inputted path that is not contained within the predetermined measurement range of the sensor; and
wherein the invalid first portion comprises a plurality of invalid points.

3. The system according to claim 2,
wherein the judging unit is configured to judge as invalid a second portion of the inputted path contained within the object existence region; and
wherein the invalid second portion comprises a plurality of invalid points.

4. The system according to claim 1, wherein the path-setting unit is configured to allocate identifiers to points of the inputted path; and
wherein the target position determining unit is configured to determine a point as the target position, on the basis of the identifiers.

5. The system according to claim 4,
wherein the closer a point on the inputted path is to a terminal position of the inputted path, the larger is the identifier value assigned to the point by the path-setting unit; and
wherein the target position determining unit is configured to determine the target position to be a point with the maximum identifier value among points on the inputted path not judged as invalid by the judging unit.

6. The system according to claim 1, further comprising:
a display configured to display the image of at least one of the inputted path, the object existence region, the path along which the mobile apparatus is to move, and the target position.

7. The system according to claim 1, further comprising:
a printer controller configured to control a printer;
wherein the mobile apparatus has the printer mounted thereon.

8. The system according to claim 1, wherein the signal generator mounted on the mobile apparatus is configured to emit at least one of a laser signal, an infrared signal, a sound signal, an ultrasonic signal, and a light signal.

9. The system according to claim 1, wherein the storage device comprises software configured to operate at least one of the path-setting unit, the measuring unit, the extracting unit, the judging unit, the target position determining unit, and the movement control unit.

10. The system according to claim 1, wherein the storage device comprises hardware configured to operate at least one of the path-setting unit, the measuring unit, the extracting unit, the judging unit, the target position determining unit, and the movement control unit.

11. The system according to claim 1, wherein while the mobile apparatus is moving, the processor is configured to repeatedly execute processing of the units until said mobile apparatus reaches a terminal position of the inputted path.

12. A system including a mobile apparatus, the system comprising:
- a signal generator mounted on the mobile apparatus;
- a sensor mounted on the mobile apparatus;
- a user interface; and
- at least one storage device, the at least one storage device including:
  - a path-setting unit configured to set a path of the mobile apparatus as a sequence of points according to an inputted path that is inputted through the user interface;
  - a measuring unit configured to measure an environment in which the mobile apparatus is situated, by emitting a signal from the signal generator to at least a predetermined measurement range of the sensor, and by using the sensor to generate measurements of the environment;
  - an extracting unit configured to extract an object existence region that represents a position of an object in the environment, according to measurements generated by the measuring unit;
  - a judging unit configured to judge as invalid a point on the inputted path when the point is at least one of (1) not within the predetermined measurement range of the sensor and (2) within the object existence region;

a target position determining unit configured to:
  (1) determine a first target position on the inputted path to which the mobile apparatus is to move, by selecting the point on the inputted path that is both closest to the terminal position of the inputted path and not judged as invalid by the judging unit, and
  (2) replace the first target position with a second target position on the inputted path, as a result of movement of the mobile apparatus, regardless of whether or not the mobile apparatus has reached the first target position, when the target position determining unit determines that the second target position is closer than the first target position to the terminal position of the inputted path and the judging unit does not judge the second target position as invalid; and
a movement control unit configured to determine a movement path of the mobile apparatus such that the mobile apparatus moves along the movement path from a current position to the first target position, and when the first target position is replaced with the second target position, to update the movement path so that the mobile apparatus moves to the second target position; and
a processor configured to, while the mobile apparatus is moving and until the mobile apparatus reaches the terminal position of the path, repeatedly execute processing to: measure the environment with the measuring unit, extract an object existence region with the extracting unit, judge as invalid a point on the inputted path with the judging unit, determine the target position with the target position determining unit, and determine the movement of the mobile apparatus with the movement control unit.

13. The system according to claim 12, wherein while the mobile apparatus is moving, the processor is configured to repeatedly execute processing of the units until said mobile apparatus reaches a terminal position of the inputted path.

* * * * *